Jan. 9, 1934.   P. W. DIETER   1,943,167
JOURNAL BEARING
Filed April 18, 1933   2 Sheets-Sheet 1
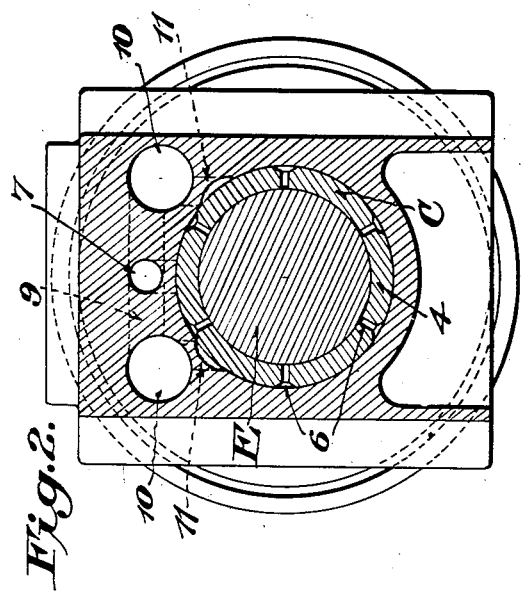
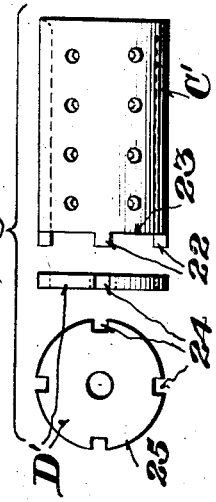
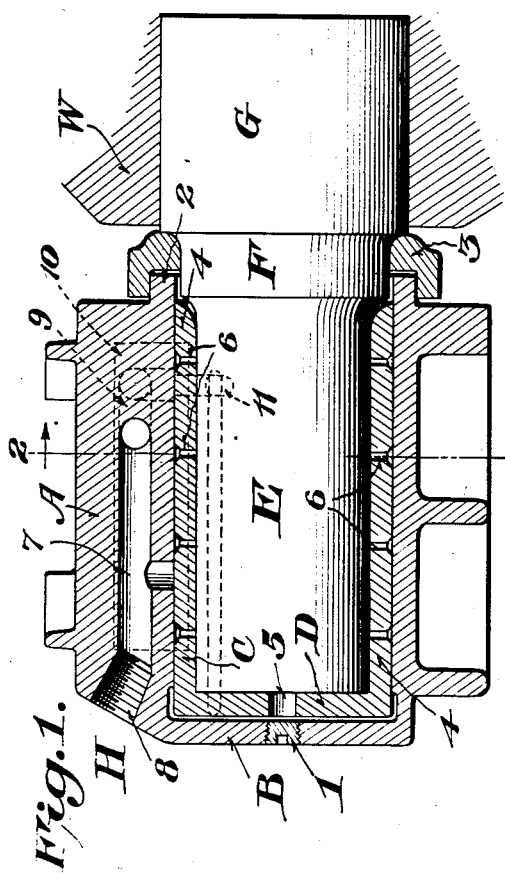
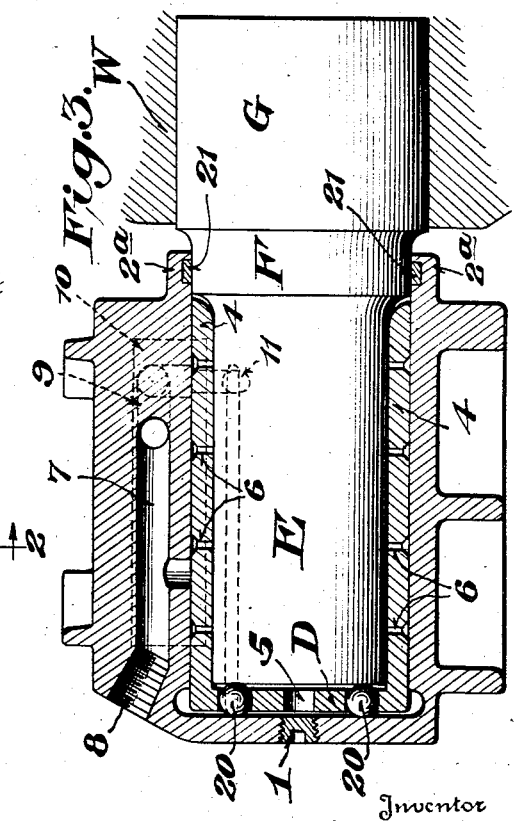
Inventor
Paul W. Dieter,
By
Attorney Jan. 9, 1934.　　　　P. W. DIETER　　　　1,943,167
JOURNAL BEARING
Filed April 18, 1933　　　2 Sheets-Sheet 2
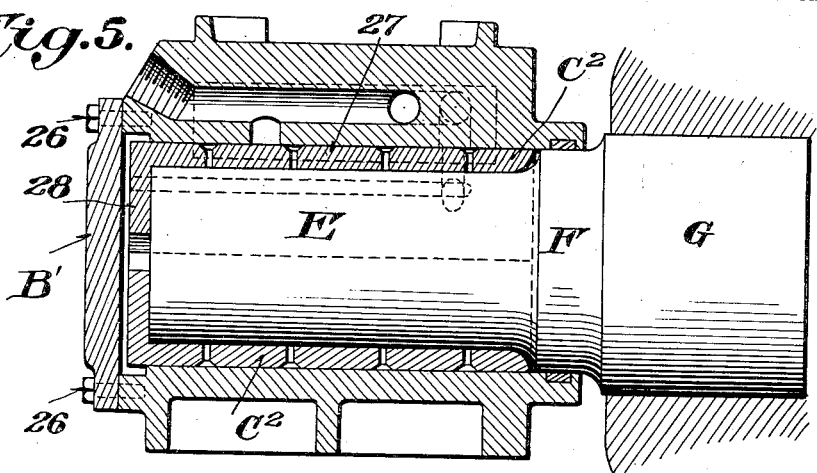
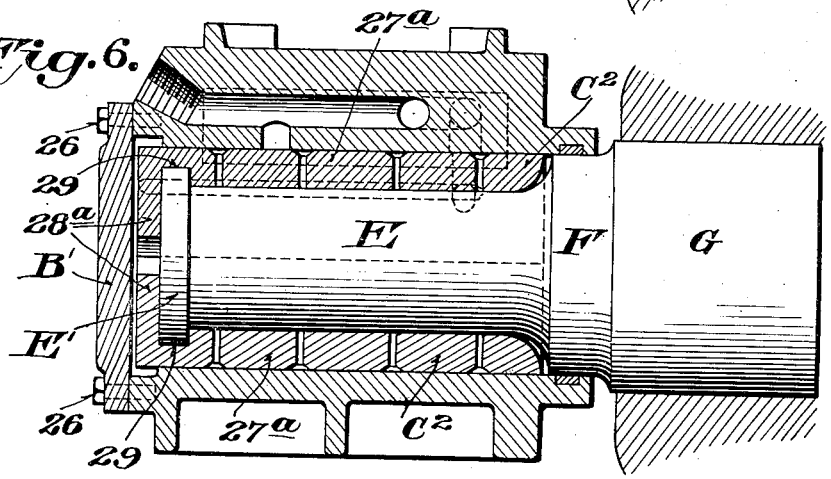
Inventor
Paul W. Dieter,
By
Attorney Patented Jan. 9, 1934

1,943,167

UNITED STATES PATENT OFFICE 1,943,167

JOURNAL BEARING

Paul W. Dieter, New York, N. Y., assignor to P. W. Dieter, Inc., New York, N. Y., a corporation of Delaware Application April 18, 1933. Serial No. 666,768

7 Claims. (Cl. 308—41)

This invention relates to journal bearings for railway rolling stock, steam and electric, and more particularly to novel improvements in bearings of the floating bushing type.

Heretofore, it has been customary to provide the floating bushing with a flange at its inner (or wheel) end adapted to take the lateral thrust of the axle against and between the wheel hub and journal box. This construction has been particularly useful and advantageous for inside style or type of bearings on locomotives.

However, for the outside style or type of bearings required for tenders and railway cars, for both steam and electric railway service, it has been found that instead of imposing the lateral thrust of the axle on a flange at the inner end of the bushing, such thrust may be taken care of by providing the bushing with a thrust wall located between the outer end of the bearing and the inside face of the outer end wall or cover of the journal box.

Accordingly, the present invention has primarily in view the provision of a floating sleeve or bushing having the characteristics of a thimble which may be fitted over the journal portion of the axle, and the box then assembled on the bushing so that the end wall or head thereof will be arranged between the outer extremity of the axle and the inside face of an outer wall of the box or casing. In that connection, the invention contemplates the provision of a bushing comprising either an integral cylindrical side wall and end thrust wall, or a longitudinally divided bushing wherein a portion of the end wall may be carried with each half of the cylinder or, on the other hand, the cylindrical portion may be integral throughout its circumference and the end thrust wall made separate. Thus, it is within the scope of the invention to provide an integral bushing structure, or, a divided or sectional structure embodying the features referred to.

Another object of the invention is to provide a novel dust guard construction.

With the foregoing and other objects in view, which will become more fully apparent as the nature of the invention is better understood, the same consists in the novel features of construction, combination and arrangement of parts hereinafter more fully described, illustrated in the accompanying drawings and defined in the appended claims.

A preferred and practical embodiment of the invention is shown in the accompanying drawings, wherein:

Figure 1 is a vertical sectional view illustrating an integral box or casing and a bushing having an integral thrust wall.

Figure 2 is a vertical sectional view taken on the line 2—2 of Figure 1.

Figure 3 is a detail vertical sectional view illustrating an integral box or casing and a bushing having integral side and thrust walls, the latter provided with anti-friction bearing elements.

Figure 4 includes face and side elevations, respectively, of a thrust plate and a side elevation of a cylindrical bushing.

Figure 5 is a detail vertical sectional view of a journal box with a removable end wall and a longitudinally divided or halved bushing, each half of the bushing having an integral thrust wall portion.

Figure 6 is a detail sectional view of a journal box and a longitudinally divided or halved floating bushing formed to fit an axle having an outer end collar.

Similar reference characters designate corresponding parts throughout the several figures of the drawings.

According to the embodiment of the invention shown in the drawings, the same essentially consists of a journal box or casing designated generally as A and having an outer end wall which may be integral with the casing, as indicated at B, or may be separate therefrom to provide a removable cover B'; the box or casing thus constructed, in either case, being adapted to receive a floating bushing C. This bushing may comprise a cylinder having an integral thrust wall D as shown in Figures 1 and 2, or a one-piece cylinder C' and a removable thrust wall D' carried therewith as shown in Figure 5. Also, according to Figures 5 and 6, the floating bushing C may consist of the longitudinally divided or halved sections $C^2$. Whether the bushing C is made with integral side and end walls, or separate side and end walls, or is longitudinally halved, or divided into sections, the same is adapted to receive the journal portion E of an axle, the latter having a dust guard diameter F and a wheel receiving diameter G for the wheel W.

Referring to Figure 1, the journal box A is provided in its upper wall with the grease supply system designated generally as H, and the integral cover wall B may be provided with a removable plug 1 for inspection purposes. The opposite or inner end of the box is provided with a flange 2 overlying the dust guard diameter F of the axle. This flange may cooperate with a dust guard ring 3, preferably shrunk on the dust guard diameter F, and having a portion overlapping and overlying the flange 2 to not only assist in retaining the grease but also excluding foreign matter from the bearing. The bushing C is formed with the integral cylindrical side wall 4 and integral thrust wall or plate D, the latter preferably being provided with an opening 5 which may serve various purposes such, for example, as a pocket for grease, an inspection opening aligning with the plug 1 to permit of viewing the end of the axle, or to permit of cleaning or flushing out the entire bearing in the event that a pressure flushing system is connected with the opening which receives the plug 1. It will, of course, be understood that the body of the bushing, namely the cylindrical side wall 4 is provided with a plurality of grease receiving openings 6 which effectively and efficiently distribute grease throughout the entire circumference of the bushing and the journal portion E of the axle.

The grease supplying system may be observed in detail from Figures 1 and 2. This system includes a main grease supplying passage 7 having one end threaded as at 8 to receive a closure plug while the opposite end communicates through the medium of ports or channels 9 with the grease storage chambers 10 which in turn communicate through the ports 11 with the outer peripheral portion of the bushing C. The passages 7, 9, 10 and 11 may be cored when the box or casing is cast, thereby cheapening the cost of manufacture. Thereafter it is only necessary to thread the outer end of the passage 7 as indicated at 8 to receive a closure plug.

Figure 3 of the drawings shows the thrust wall D provided with anti-friction bearings 20. These bearings will not only take the end thrust of the journal portion E of the axle but will also assist in the positive propulsion or rotation of the cylindrical portion of the bushing due to the differential angular velocity between the journal portion E of the axle and the anti-friction elements 20.

It will also be observed from Figure 3 that the dust guard flange 2a may be extended over the dust guard diameter F of the axle and provided on its inner face with an annular cavity for receiving a suitable packing material 21 such as felt, leather or the like, to assist in retaining the grease and excluding foreign matter. In Figure 4 of the drawings, however, the cylindrical body C' is provided with alternate lugs and recesses 22 and 23 respectively adapted to receive corresponding mating portions 24 and 25 formed in the edge of the thrust wall D'. Thus, while the cylinder and thrust walls may be separate, they may be interlocked, in the manner illustrated for example.

It is also within the scope of the invention, as previously indicated, to make the outer wall or cover B' of the box removable. In this event, the wall B' is held to the body of the box or casing by means of the removable fastenings 26. This arrangement permits of the utilization of the longitudinally divided or halved bushing comprising the sections C². These sections comprise the semi-cylindrical body portions 27 and the semi-circular thrust wall portions 28. In the event that it becomes necessary to make renewals or repairs with this arrangement, it is only necessary to remove the cover B' of the box and then withdraw the sections C².

Figure 6 illustrates the application of a longitudinally divided or halved bushing to a type of axle whose journal portion E is provided with a collar E'. That is to say, the inner wall of the semi-cylindrical sections 27a may be provided with an annular groove 29 for receiving the collar E'. In this form of the invention, each half bushing is directly interlocked with the journal portion E of the axle and the semi-cylindrical portions 28a constituting the thrust wall of the bushing will bear against the inside face of the outer wall of the journal box as the axle shifts or moves in the direction of its axis. According to this embodiment, it is immaterial whether the outer wall of the box be made separate as indicated at B' in Figure 6, or whether it be made integral as shown at B in Figure 1 for example.

From the foregoing, it will be apparent that the essential features and characteristics of the invention reside in providing the floating bushing with a thrust wall at the axle end of the journal for engaging with the inside face of the outer end wall or cover of the box. The drawings illustrate the wide range of modification that may be resorted to in carrying this object into effect. However, it will, of course be understood that further changes and modifications may be resorted to, within the scope of the appended claims.

I claim:

1. In a journal box, a floating bushing comprising a cylindrical body and a thrust wall located at one end thereof, and anti-friction members positioned in said thrust wall.

2. In a railway journal bearing, the combination with a journal box having an outer end wall and an interior bore and also having lubricant supply means in a wall thereof communicating with said bore, of a floating bushing fitting in said bore and including a cylindrical perforated body portion and a thrust bearing wall positioned adjacent the inside face of the said outer end wall of the box, said body and end wall receiving lubricant from the lubricant supply means to lubricate a journal portion of a rotatable car axle fitting within said bushing.

3. In a railway journal bearing, the combination of a journal box having an outer end wall and an interior bore of a diameter to clear the dust guard diameter of a rotatable car axle, the said journal box having lubricant supply means in a wall thereof communicating with said bore, and a floating bushing including a cylindrical perforated body having an end thrust wall adapted to lie adjacent the inside face of said outer wall of the journal box, the body of said floating bearing being of a thickness to fill the space between the bore of the journal box and the reduced journal diameter of a railway car axle.

4. In a journal bearing, a floating bushing comprising a cylindrical body having lubricating openings therein, a lug projecting from one end of said body and a removable thrust disk provided with a recess for receiving said lug.

5. In a journal bearing, a floating bushing comprising a cylindrical body, and a removable thrust bearing plate at the outer end of said body to receive thrust from a car axle, and means for detachably interlocking the plate with the body.

6. In a railway journal bearing, the combination of a journal box having an end wall and an interior diameter corresponding to substantially the diameter of the dust guard portion of a car axle, lubricant storage means in a wall of the box and communicating with a lubricant distributing groove formed on the inside face of said bore and extending to a point adjacent the inside of the said outer wall of the box, a floating bushing comprising a perforated cylindrical body and a perforated end thrust wall fitting within the interior bore of the journal box, whereby said end thrust wall will lie adjacent the inside face of the outer end wall of the box and in lubricant receiving relation to the end of said groove, the body of said floating sleeve being adapted to receive the reduced journal diameter of a rotatable car axle.

7. In a railway journal bearing, the combination of a journal box having an outer end wall and an interior bore of a diameter to clear the dust guard diameter of a rotatable car axle, the said journal box having lubricant supply means in a wall thereof communicating with said bore, sealing means in said bore at the point where it overlies the dust guard diameter of the axle, and a floating bushing including a cylindrical perforated body and an end thrust wall adapted to lie adjacent the inside face of said outer wall of the journal box, the body of said floating bushing being of a thickness to fill the space between the bore of the journal box and the reduced journal diameter of the car axle.

PAUL W. DIETER.